J. HARPER.
Hay Raker and Loader.
No. 75,416.
Patented March 10, 1868.
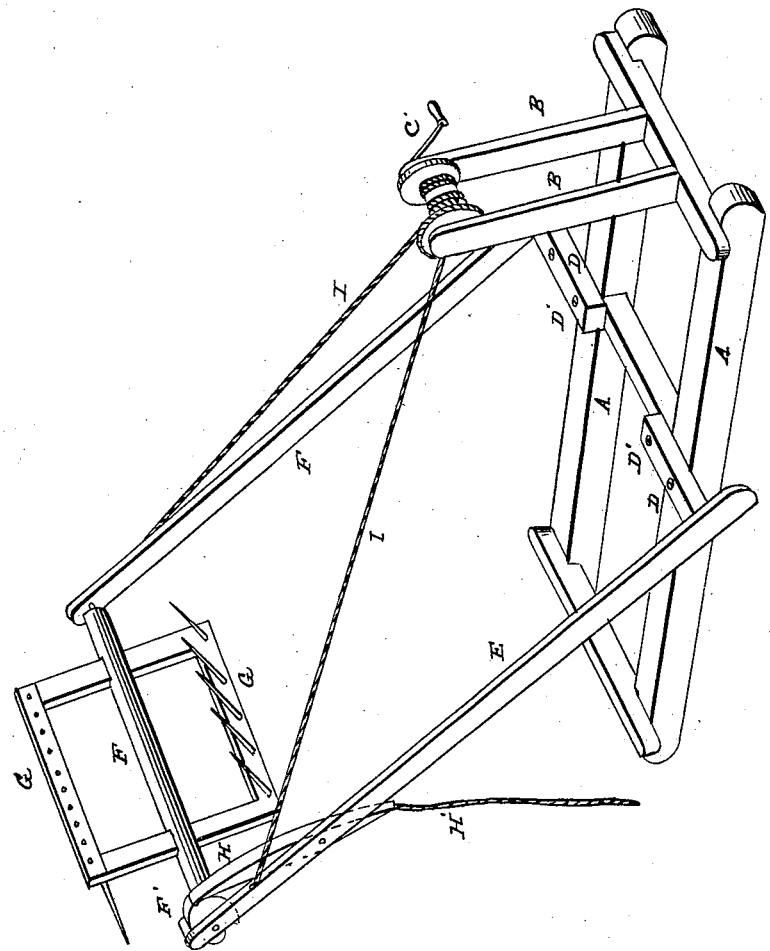
WITNESSES:
INVENTOR.

United States Patent Office.

JOHN HARPER, OF HILLSBORO, IOWA.

Letters Patent No. 75,416, dated March 10, 1868.

IMPROVEMENT IN HAY-RAKERS AND LOADERS.

*The Schedule referred to in these Letters Patent and making part of the same.*

TO ALL WHOM IT MAY CONCERN:

Be it known that I, JOHN HARPER, of Hillsboro, in the county of Henry, and State of Iowa, have invented a new and useful Improvement in Hay-Loaders; and I do hereby declare that the following is a full, clear, and exact description of the same, reference being had to the annexed drawings, making part of this specification, in which the machine is shown in perspective.

This improvement relates to the construction of a machine, which, being attached to the bed of a wagon, may be employed for gathering the hay from the ground and loading it directly upon the wagon.

In the annexed drawings, A is the frame. The standards B B, attached to the front of the frame, support a spool, C, turned by a winch, C'. Two pieces D D are pivoted, one on each side of the frame, being held extended by means of pins D', which may be removed, so as to allow the pieces to fold back parallel with the sides of the frame, to pass gates or other narrow places. The arms E E are pivoted upon the ends of the pieces D D, so as to swing freely vertically. They support the revolving shaft F, which carries the rake-head G attached thereto, and consisting of a wooden frame on each side of the shaft, from which rows of rake-teeth project, as represented in the drawings. A ratchet, F', is placed on the end of the shaft, into which the pawl H works, being pressed against the ratchet-wheel by a spring. A cord, H', attached to the end of the pawl, enables the operator to detach the pawl, thus permitting the rake-head to revolve and discharge its load when desired. The arms E E are connected with the spool C by cords I.

This machine is intended to be operated by two men—one of them riding upon the wagon to drive the team and operate the winch C'; the other, walking behind, guides the rake, which, dragging along the ground with the teeth projecting horizontally in front, will catch the hay and gather it. When a load has been gathered the operator on the ground turns the teeth up a little, the ratchet and pawl preventing its revolution to discharge the hay. The team being stopped, the driver, turning the winch C', winds the ropes I upon the spool C, and raises the rake-head with its load of hay over the wagon. When over the place desired to receive it, the operator on the ground, by pulling the rope H', will disengage the pawl H, and the weight of the hay will instantly cause the rake-head to revolve, and the hay will fall upon the wagon.

What I claim as my invention, and desire to secure by Letters Patent, is—

1. The revolving rake-head G attached to arms E E, and used in combination with the elevating-cords I and spool C, and the ratchet F' and pawl H, said parts being arranged to operate substantially in the manner and for the purpose set forth.

2. In combination with the frame A and elevating-arms E, the pieces D, pivoted to the frame, and held extended by the pins D', so as to permit the width of the frame to be diminished when necessary, substantially in the manner set forth.

In testimony whereof, I have signed my name to this specification in the presence of two subscribing witnesses.

JOHN HARPER.

Witnesses:
JOHN L. JORDAN,
J. C. NEWBOLD.